(12) United States Patent
Arora

(10) Patent No.: US 12,183,201 B1
(45) Date of Patent: Dec. 31, 2024

(54) MACHINE LEARNING PARKING DETERMINATION

(71) Applicant: Krish Arora, Cupertino, CA (US)

(72) Inventor: Krish Arora, Cupertino, CA (US)

( * ) Notice: Subject to any disclaimer, the term of this patent is extended or adjusted under 35 U.S.C. 154(b) by 0 days.

(21) Appl. No.: 18/511,987

(22) Filed: Nov. 16, 2023

(51) Int. Cl.
| | |
|---|---|
| *G08G 1/14* | (2006.01) |
| *G06Q 30/0283* | (2023.01) |
| *G06T 7/70* | (2017.01) |
| *G06V 10/70* | (2022.01) |
| *G06V 20/17* | (2022.01) |
| *G06V 20/52* | (2022.01) |

(52) U.S. Cl.
CPC ......... *G08G 1/146* (2013.01); *G06Q 30/0284* (2013.01); *G06T 7/70* (2017.01); *G06V 10/70* (2022.01); *G06V 20/17* (2022.01); *G06V 20/52* (2022.01); *G06T 2200/24* (2013.01); *G06T 2207/10032* (2013.01); *G06T 2207/20081* (2013.01); *G06T 2207/20132* (2013.01); *G06T 2207/30232* (2013.01); *G06T 2207/30252* (2013.01); *G06V 2201/08* (2022.01)

(58) Field of Classification Search
CPC ...... G08G 1/146; G06Q 30/0284; G06T 7/70; G06T 2200/24; G06T 2207/10032; G06T 2207/20081; G06T 2207/20132; G06T 2207/30232; G06T 2207/30252; G06V 10/70; G06V 20/17; G06V 20/52; G06V 2201/08
See application file for complete search history.

(56) References Cited

U.S. PATENT DOCUMENTS

| | | | | |
|---|---|---|---|---|
| 10,157,543 | B1* | 12/2018 | Shah | G08G 1/146 |
| 10,474,904 | B1* | 11/2019 | Correnti | B60Q 9/002 |
| 2018/0276841 | A1* | 9/2018 | Krishnaswamy | G06V 10/25 |
| 2019/0228658 | A1* | 7/2019 | Huang | G06T 7/97 |
| 2020/0200562 | A1* | 6/2020 | Vereshchagin | G06F 16/285 |
| 2021/0019671 | A1* | 1/2021 | Cao | G08G 1/146 |
| 2023/0137256 | A1* | 5/2023 | Chien | G08G 1/144 |
| | | | | 340/932.2 |
| 2023/0260400 | A1* | 8/2023 | Baird | G06V 20/586 |
| | | | | 340/932.2 |
| 2023/0286408 | A1* | 9/2023 | Kinsey | B60L 53/62 |
| 2023/0394686 | A1* | 12/2023 | Min | G06V 10/751 |
| 2024/0087455 | A1* | 3/2024 | Higuchi | G08G 1/146 |

\* cited by examiner

*Primary Examiner* — Dhaval V Patel
(74) *Attorney, Agent, or Firm* — Kunzler Bean & Adamson

(57) ABSTRACT

Apparatuses, systems, methods, and computer program products for machine learning parking determination. A method includes receiving an image of a parking spot taken by an image sensor. A method includes processing an image of a parking spot using a machine learning model to determine a likelihood that the parking spot is occupied. A method includes communicating to a user, on an electronic display screen of a hardware computing device, whether a parking spot is occupied or available based on a determined likelihood that the parking spot is occupied.

14 Claims, 5 Drawing Sheets

MACHINE LEARNING PARKING DETERMINATION

FIELD

This invention relates to parking availability determination and more particularly relates to determining an availability of parking spots using machine learning.

BACKGROUND

Finding parking is a problem worldwide. This problem is more than time consuming and a personal annoyance, it is estimated that about 30% of vehicle emissions are created by drivers searching for parking, unnecessarily contributing to the global climate crisis.

SUMMARY

Apparatuses for machine learning parking determination are presented. In one embodiment, an apparatus includes an image sensor. An apparatus, in some embodiments, includes an electronic hardware parking device in communication with an image sensor. An electronic hardware parking device, in certain embodiments, includes a processor and a memory. A memory, in one embodiment, stores computer program code executable by a processor to perform operations. An operation, in certain embodiments includes receiving an image of a parking spot taken by an image sensor. In a further embodiment, an operation includes processing an image of a parking spot using a machine learning model to determine a likelihood that the parking spot is occupied. An operation, in some embodiments, includes communicating to a user, on a hardware computing device, a determined likelihood that a parking spot is occupied.

Computer program products comprising a non-transitory computer readable storage medium storing computer program code executable to perform operations for machine learning parking determination are presented. In one embodiment, an operation includes receiving an image of a parking spot taken by an image sensor. An operation, in a further embodiment, includes processing an image of a parking spot using a machine learning model to determine a likelihood that the parking spot is occupied. In certain embodiments, an operation includes communicating to a user, on an electronic display screen of a hardware computing device, whether a parking spot is occupied or available based on a determined likelihood that the parking spot is occupied.

Methods for machine learning parking determination are presented. A method, in one embodiment, includes receiving an image of a parking spot taken by an image sensor. A method, in some embodiments, includes processing an image of a parking spot using a machine learning model to determine a likelihood that the parking spot is occupied. In a further embodiment, a method includes communicating to a user, on an electronic display screen of a hardware computing device, whether a parking spot is occupied or available based on a determined likelihood that the parking spot is occupied.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Aspects of the present invention are described herein with reference to system diagrams, flowchart illustrations, and/or block diagrams of methods, apparatuses, systems, and computer program products according to embodiments of the invention. It will be understood that blocks of the flowchart illustrations and/or block diagrams, and combinations of blocks in the flowchart illustrations and/or block diagrams, can be implemented by computer readable program instructions.

Figure 1:
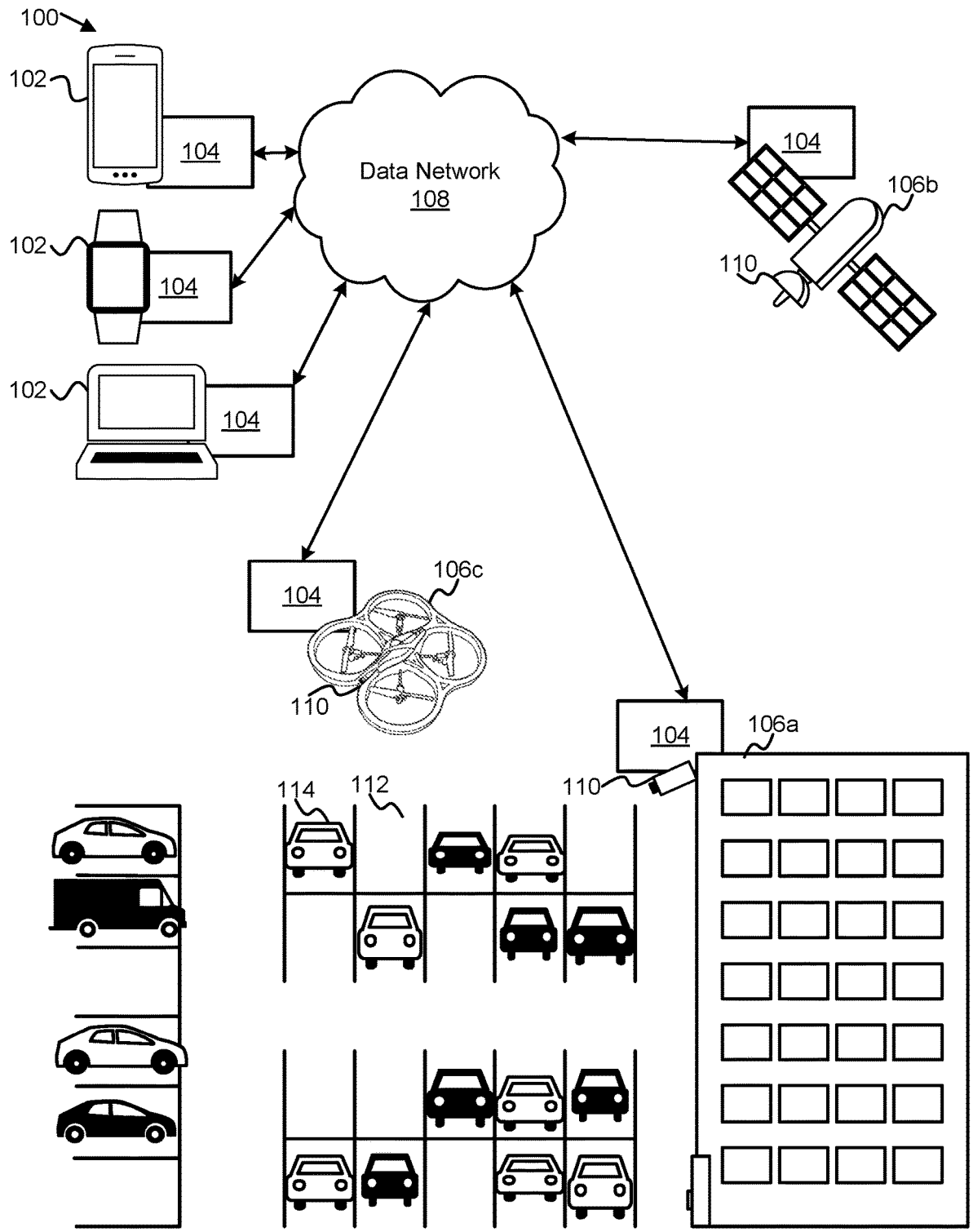
FIG. 1 is a perspective view illustrating one embodiment of a system for machine learning parking determination.

FIG. 1 depicts one embodiment of a system 100 for machine learning parking determination. The system 100, in the depicted embodiment, includes one or more hardware computing devices 102 (e.g., with electronic display screens or the like), one or more electronic hardware parking devices 104, one or more sensor mount devices 106 (e.g., a building 106a, a satellite 106b, an airborne drone 106c, a post, a vehicle 114, or the like), a data network 108, one or more image sensors 110, one or more parking spots 112, and one or more vehicles 114.

In general, an electronic hardware parking device 104 is configured to receive and process one or more images (e.g., still images, videos, video frames, or the like) from an image sensor 110 using machine learning to determine a likelihood that one or more parking spots 112 are occupied and/or are available within a field of view of the image sensor 110, and to communicate the determined likelihood (e.g., whether a parking spot 112 is occupied and/or available, a number of parking spots 112 likely to be occupied and/or available, a recommended location for a user to find an available parking spot 112, or the like) to a user on an electronic display screen of a hardware computing device 102, or the like.

An electronic hardware parking device 104, in some embodiments, may reduce certain carbon emissions created by drivers searching for parking. A electronic hardware parking device 104 may comprise a hybrid deep learning neural network and/or other machine learning that provides users real-time and/or predicted availability of parking spots in an efficient, affordable manner. For example, in certain embodiments, an electronic hardware parking device 104 may comprise one or more machine learning models (e.g., for image recognition and/or classification, object/event detection, or the like) trained on images (e.g., still images, video, video frames, or the like) of one or more parking spots 112 and/or vehicles 114. In various embodiments, an electronic hardware parking device 104 may use a convolutional neural network, a deep learning model, a single-label classification model, a multi-label classification model, an image segmentation model, an object detection model, a support vector machine model, a scale-invariant feature transform model, a maximally stable extremal regions model, a speeded-up robust features model, a histogram of oriented gradients model, a rule-based classification model, a region-based convolutional neural network, a region proposal network model, a single shot detector model, a K-means clustering model, an iterative self-organizing data analysis technique model, a maximum likelihood model, a minimum distance model, a residual network model, and/or another machine learning model configured to process images from an image sensor 110 to determine a likelihood that a parking spot 112 is occupied and/or available, or the like.

An electronic hardware parking device 104 may comprise one or more machine learning models that take as input images of parking lots 112 and/or other parking spots 112 and output which parking spots 112 are free/available and/or busy/occupied, aiding drivers or other users in quickly finding vacant parking spots 112 and reducing pollution caused by inefficiently searching for parking. An electronic hardware parking device 104 may be efficient and/or affordable enough to allow most or any parking structure to be monitored to produce free or busy parking results. In this manner, an electronic hardware parking device 104 may monitor substantially any parking spot 112 accessible by some sort of camera 110 and/or other image sensor 110, allowing an electronic hardware parking device 104 to monitor even parking lots 112 accessible by satellite 106b and/or to monitor below-ground/hidden parking lots 112.

An electronic hardware parking device 104 may allow users to easily search a destination, time, and/or distance away that they are willing to park, and to either receive real-time parking availability communications and/or predictions on which parking spots 112 will be free/available. An electronic hardware parking device 104 may allow underutilized parking spots 112 to be used more often, thereby reducing waste and/or maximizing an efficiency of a parking lot 112. Furthermore, an electronic hardware parking device 104 may reduce a cruising time of vehicles 114 spent looking for available parking spaces 112, reducing an environmental impact otherwise caused by searching for parking 112.

Further, in some embodiments, an electronic hardware parking device 104 may be disposed in a developing and/or underprivileged area, where other types of typing sensors may be prohibitively expensive. For example, a single image sensor 110 (e.g., a pre-existing security camera 110 disposed on a nearby building 106a or post 106, a camera 110 or other image sensor 110 of a satellite 106b, a camera 110 or other image sensor 110 of an airborne drone 106c, or the like) may cover an entire parking lot 112, multiple parking lots 112, and/or other groups of parking spots 112, and/or may be moved or transferred to a different location to monitor other parking spots 112.

A camera 110 and/or another image sensor 110 may be directly coupled to and/or in direct communication with an electronic hardware parking device 104, and/or may be in communication with an electronic hardware parking device 104 over a wireless and/or wired data network 108. An electronic hardware parking device 104, in certain embodiments, may be configured to process and/or make predictions for parking spots 112 with a wide variety of lighting and/or camera 110 angles, a variety of obstacles and/or weather conditions, or the like. An electronic hardware parking device 104 may perform both a classification of individual parking spots 112 and a regression to determine a total number of available parking spots 112 in a predefined area (e.g., a parking lot 112 or the like). An electronic hardware parking device 104 may record how long a parking spot 112 has been occupied/available in order to alert a parking lot 112 owner, administrator, and/or other user about underutilized parking 112 and/or automobiles 114 that have stayed in a parking spot 112 for too long, or the like.

In some embodiments, an electronic hardware parking device 104 may provide an interface (e.g., a graphical user interface (GUI), a command line interface (CLI), an application programming interface (API), or the like) to an owner, administrator, and/or other user to provide the electronic hardware parking device 104 access to a camera 110 with a view of one or more parking spots 112 (e.g., a preexisting security camera 110, a newly installed camera 110 installed for the purpose, or the like). Providing access to a camera 110 or other image sensor 110 with a view of a user's parking lot 112 may provide the user with one or more benefits, such as increased traffic to the user's building 106a, parking lot 112, and/or other location. Parking availability data from one or more electronic hardware parking devices 104, in various embodiments, may reduce driving time for users looking for parking 112, may reduce pollution/emissions, may reduce fuel/energy usage, may increase parking usage and/or efficiency, may increase safety by reducing vandalism and/or other suspicious behavior, or the like.

An electronic hardware parking device 104, in certain embodiments, may comprise a machine learning model selected and/or tuned to execute on inexpensive and/or efficient computing hardware, such as a mobile computer hardware device 102, an embedded hardware device 102, hardware of an image sensor 110, another edge hardware device 102, and/or a combination thereof. In a further embodiment, at least a portion of a machine learning model and/or other executable code of an electronic hardware parking device 104 may execute on a backend hardware server device 102, or the like, remote from one or more image sensors 110 (e.g., to combine parking availability data and/or predictions from multiple image sensors 110, to communicate parking availability data to a user on an electronic display screen of a hardware computing device 102, or the like).

An electronic hardware parking device 104 may be configured to receive images (e.g., still images, video, video frames, or the like) of one or more parking spots 112 taken by one or more image sensors 110. An electronic hardware parking device 104, in cooperation with an image sensor 110 or the like, in various embodiments, may substantially continuously take video of one or more parking spots 112, may periodically take images of one or more parking spots 112 at one or more increments, may convert video and/or video frames of one or more parking spots 112 into still images, or the like.

An electronic hardware parking device 104 may be configured to process one or more images of one or more parking spots 112 using a machine learning model to determine a likelihood that the one or more parking spots are occupied, available, or the like. For example, an electronic hardware parking device 104 may process an image using a machine learning model trained on occupied and available parking spots 112 to classify a parking spot 112 as either occupied or available, may use an object recognition machine learning model to determine whether or not a vehicle 114 is present (e.g., recognized) in a parking spot 112, or the like. In one embodiment, an electronic hardware parking device 104 may process and/or determine availability of multiple parking spots 112 in a single image. In a further embodiment, an electronic hardware parking device 104 may crop individual parking spots 112 from an image and process the separate cropped images individually to determine separate likelihoods that the individual parking spots 112 are available and/or occupied, or the like.

In some embodiments, in addition to or instead of performing real time determinations of parking spot 112 availability, an electronic hardware parking device 104 may be configured to predict (e.g., using a second machine learning model or the like) whether one or more parking spots 112 are likely to be occupied or available at a future time (e.g., using regression, based on a likelihood that the parking spot 112 is currently occupied, based on a history of one or more pervious determinations of likelihoods that the parking spot 112 is occupied, based on weather forecasts, based on timestamps of previous determinations, based on location specific event and/or calendar information, or the like). For example, an electronic hardware parking device 104 may determine that parking spots 112 are more or less likely to be available during rain or other inclement weather, or make other predictions based on images from one or more image sensors 110 and/or other supplemental data.

An electronic hardware parking device 104, in one embodiment, is configured to communicate to a user (e.g., on an electronic display screen of a hardware computing device 102, over a speaker of a hardware computing device, or the like) whether one or more parking spots 112 are occupied or available based on one or more determined likelihoods and/or other determinations from a machine learning model. For example, an electronic hardware parking device 104 may provide a website available to users on hardware computing devices 102 over a data network 108, a mobile and/or desktop application executable on a hardware computing device 102, or the like listing available parking spots 112, a total number or percentage of available and/or occupied parking spots 112 in a region or other location, an indicator of whether one or more parking spots 112 are available or occupied (e.g., icons, colors, images, animations, categories, and/or other indicators such as red/yellow/green, empty/full, or the like). In certain embodiments, an electronic hardware parking device 104 may display substantially real time images of one or more parking spots 112 from one or more image sensors 110 to a user (e.g., on a website, in an executable application, or the like) on an electronic display screen of a hardware computing device 102.

An electronic hardware parking device 104, in some embodiments, provides a graphical user interface to a user on an electronic display screen of a hardware computing device 102 (e.g., a website, an executable application, or the like) allowing the user to enter a location, provide their current location, or the like and the electronic hardware parking device 104 displays parking spot 112 availability data. For example, an electronic hardware parking device 104 may provide a graphical user interface allowing a user to provide a location, a range from that location (e.g., how far away a parking spot 112 may be from the provided location), a date and/or time of day, and/or other information and the electronic hardware parking device 104 may display parking spot 112 availability data according to the provided input (e.g., showing where available parking spots 112 currently are, predicting where available parking spots 112 may be at a future time or date, or the like).

An electronic hardware parking device 104, in one embodiment, may communicate parking spot 112 availability data for a plurality of different parking spots 112 based on images from different image sensors 110 (e.g., displaying parking spot 112 availability for different parking lots 112, different locations, or the like). In a further embodiment, an electronic hardware parking device 104 may integrated display and/or other communication of parking spot 112 availability data into a navigation interface displayed on an electronic display screen of a hardware computing device 102 (e.g., displaying available parking spots 112 near a destination, displaying directions to an available parking spot 112, or the like).

In some embodiments, an electronic hardware parking device 104 may communicate and/or notify an administrator and/or other user of one or more parking conditions. For example, an electronic hardware parking device 104 may be configured to notify an administrator and/or other user associated with a parking spot 112 in response to determining that the parking spot 112 has been occupied for at least a threshold amount of time (e.g., a threshold set by the user), indicating that the automobile 114 in the parking spot 112 has been abandoned, or the like. In a further embodiment, an electronic hardware parking device 104 may be configured to notify an administrator and/or other user associated with a parking spot 112 in response to determining that a parking spot 112 has been available/unused for at least a threshold period of time, indicating that the parking spot 112 may be unnecessary, that parking costs should be reduced, or the like.

An electronic hardware parking device 104, in certain embodiments, may be configured to dynamically adjust a cost of parking based on whether parking spots 112 are occupied or available (e.g., based on a user defined cost setting, or the like). For example, an electronic hardware parking device 104 may increase a cost of parking during busy times when few parking spots 112 are available, may decrease a cost of parking during less busy times when more parking spots 112 are available, and/or may make one or more other dynamic adjustments to a cost of parking based on whether one or more parking spots 112 are occupied or available.

Figure 3:
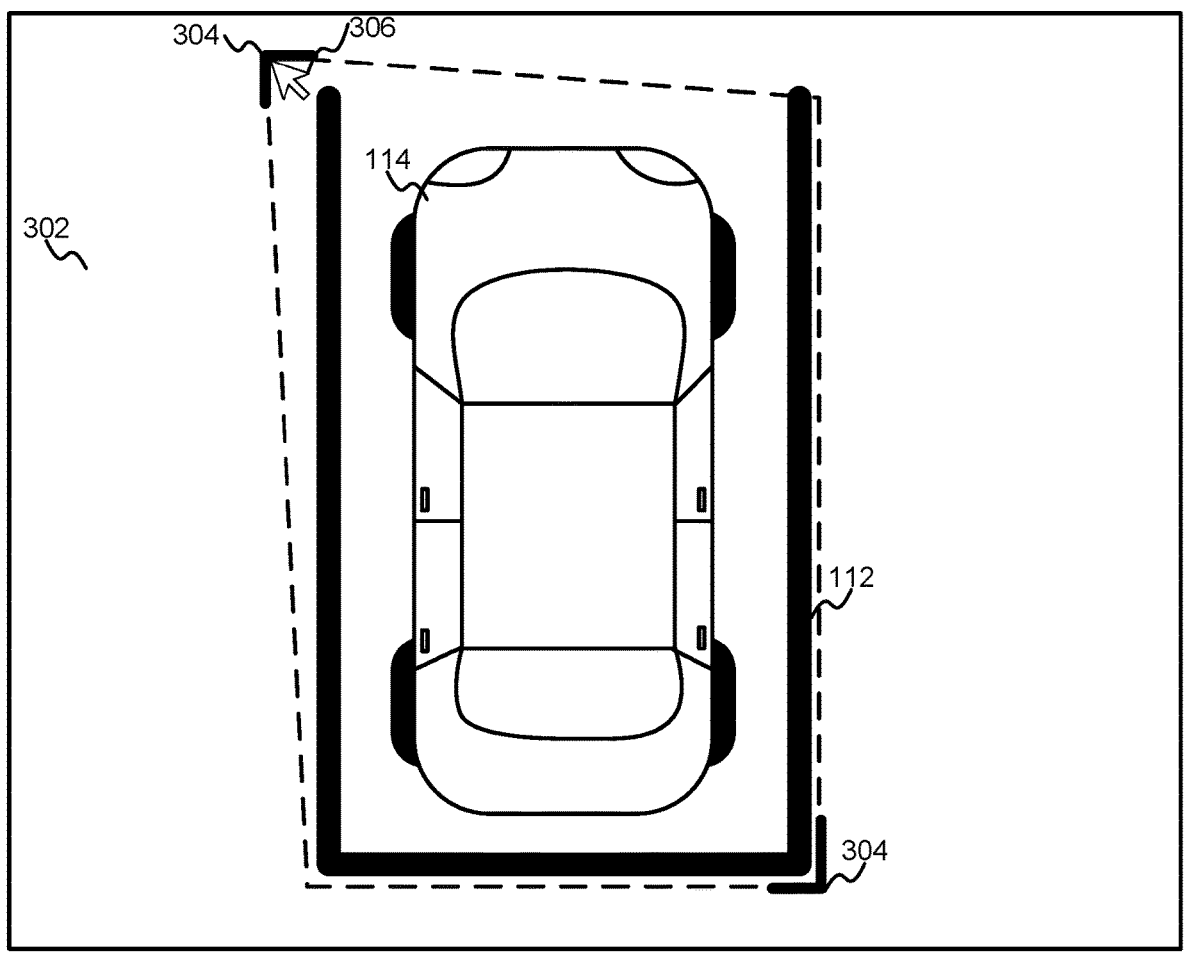
FIG. 3 is a schematic block diagram illustrating one embodiment of a graphical user interface for machine learning parking determination.

As depicted in FIG. 3 and described below, in some embodiments, an electronic hardware parking device 104 may display or otherwise present a graphical user interface to an administrator associated with a parking spot 112 or another user, allowing the administrator to define, in an image of the parking spot 112, a location of the parking spot 112. For example, an electronic hardware parking device 104 may provide a graphical user interface tool allowing an administrator or other user to define a location by selecting at least two diagonal corners of a parking spot 112 (e.g., defining a rectangle of the parking spot 112, or the like). An electronic hardware parking device 104 may repeat this process to define all or most parking spots 112 in a location (e.g., a parking lot 112, parking spots 112 visible in an image, or the like). In some embodiments, an electronic hardware parking device 104 may crop individual parking spots 112 from an image for processing the image using a machine learning model, or the like.

In a further embodiment, an electronic hardware parking device 104 may automatically detect and/or define parking spots 112 in an image from an image sensor 110. For example, an electronic hardware parking device 104 may process an initial and/or previous image of a parking spot 112 using a machine learning model to detect an object 114 comprising a vehicle 114, may determine whether the object/vehicle 114 is still for at least a predefined period of time (e.g., being parked, by analyzing subsequent images/video, or the like), and may define a parking spot 112 in response to detecting the object/vehicle 114 being still (e.g., defining the parking spot 112 as a location in which the object/vehicle 114 was still for at least a predefined period of time, or the like). An electronic hardware parking device 104 may use a machine learning model to recognize whether subsequent objects/vehicles 114 are parked in the previously defined parking spot 112, to determine whether the parking spot 112 is available or occupied.

In one embodiment, one or more image sensors 110 are directly and/or indirectly coupled to an electronic hardware parking device 104 (e.g., electrically coupled, digitally coupled over a data network 108, or the like), with each image sensor 110 in proximity to a parking spot 112 so that the image sensor 110 is in view of the parking spot 112. In some embodiments, an image sensor 110 may be remote from an electronic hardware parking device 104 (e.g., comprising, disposed on, and/or executing on a backend server device 102, or the like) and the electronic hardware parking device 104 may receive images of parking spots 112 from the image sensor 110 over a data network 108 (e.g., using an application programming interface of the electronic hardware parking device 104, or the like).

In some embodiments, an electronic hardware parking device 104 may comprise logic hardware such as one or more of a processor (e.g., a CPU, a controller, a microcontroller, firmware, microcode, an application specific integrated circuit (ASIC), a field programmable gate array (FPGA) or other programmable logic, or the like), a volatile memory, a non-volatile computer readable storage medium, a network interface, a printed circuit board, or the like. An electronic hardware parking device 104, in further embodiments, may include computer program code stored on a non-transitory computer readable storage medium (e.g., of an image sensor 110 and/or of a hardware computing device 102), executable by a processor to perform one or more of the operations described herein, or the like.

An electronic hardware parking device 104, in certain embodiments, may receive one or more commands, user input, or the like from a hardware computing device 102; may send one or more notifications, messages, alerts or the like to a hardware computing device 102 over a data network 108; and/or otherwise be in communication with a hardware computing device 102 (e.g., a control panel; a server computing device; a mobile computing device such as a smartphone, a smart watch, a tablet, a laptop, or the like; a desktop computer; and/or another hardware computing device 102 comprising a processor and a memory).

The data network 108, in one embodiment, includes a digital communication network that transmits digital communications. The data network 108 may include a hardwired network, a serial bus, a wireless network, such as a wireless cellular network, a local wireless network, such as a Wi-Fi network, a Bluetooth® network, a near-field communication (NFC) network, an ad hoc network, or the like. The data network 108 may include a wide area network (WAN), a local area network (LAN), an optical fiber network, the internet, or other digital communication network. The data network 108 may include a combination of two or more networks. The data network 108 may include one or more servers, routers, switches, and/or other networking equipment.

One or more electronic hardware parking devices 104, hardware computing devices 102, and/or image sensors 110 may be in communication over a data network 108, either directly or indirectly through a backend server computing device, or the like. An electronic hardware parking device 104 executing on a hardware computing device 102 (e.g., computer executable program code, an installable application, a mobile application, or the like), in some embodiments, may provide a user interface to notify a user and/or for a user to perform one or more actions and/or selections described herein.

Figure 2:
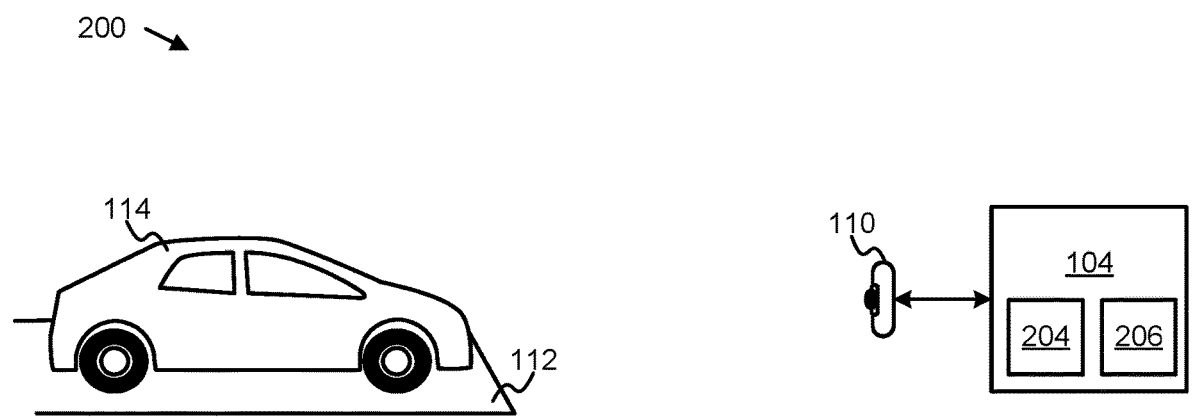
FIG. 2 is a schematic block diagram illustrating a further embodiment of a system for machine learning parking determination.

FIG. 2 depicts one embodiment of a system 200 for machine learning parking determination. The electronic hardware parking device 104, the image sensor 110, the parking spot 112, and/or the vehicle 114 of FIG. 2, in some embodiments, may be substantially similar to the electronic hardware parking device 104, the image sensor 110, the parking spot 112, and/or the vehicle 114 described above with regard to FIG. 1. In the depicted embodiment, the electronic hardware parking device 104 includes a processor 204 and a memory 206.

In some embodiments, an electronic hardware parking device 104 may comprise computer program code stored in a memory 206 and executable by a processor 204 to perform one or more of the operations described herein with regard to an electronic hardware parking device 104. For example, a processor 204 may comprise a CPU, a controller, a microcontroller, firmware, microcode, an ASIC, an FPGA or other programmable logic, or the like and a memory 206 may comprise a volatile memory, a non-transitory computer readable storage medium, or the like in communication with the processor 204.

FIG. 3 depicts one embodiment of a graphical user interface 300 for machine learning parking determination. For example, an electronic hardware parking device 104 may display a graphical user interface 300 on an electronic display screen of a hardware computing device 102, enabling an administrator or other user to define a location of a parking spot 112 in an image 302 from an image sensor 110. In the depicted embodiment, a user may use a mouse 306 or other user input element 306 to select and drag at least two diagonal corners 304 of the parking spot 112 to define the location of the parking spot 112. In some embodiments, an electronic hardware parking device 104 may crop subsequent images 302 based on the definition of the parking spot 112 to process the image 302 using a machine learning model to determine a likelihood that the parking spot 112 is occupied.

Figure 4:
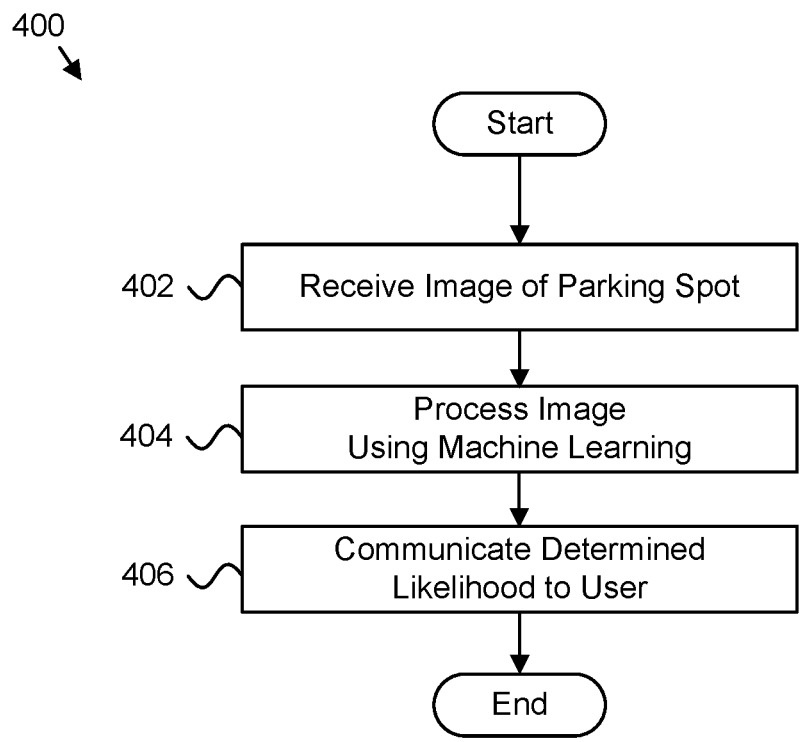
FIG. 4 is a schematic flow chart diagram illustrating one embodiment of a method for machine learning parking determination.

FIG. 4 depicts one embodiment of a method 400 for machine learning parking determination. The method 400 begins and an electronic hardware parking device 104 receives 402 an image 302 of a parking spot 112 taken by an image sensor 110. An electronic hardware parking device 104 processes 402 the image 302 of the parking spot 112 using a machine learning model to determine a likelihood that the parking spot 112 is occupied. An electronic hardware parking device 104 communicates 406 to a user, on an electronic display screen of a hardware computing device 102, whether the parking spot 112 is occupied or available based on the determined 404 likelihood that the parking spot 112 is occupied and the method 400 ends.

Figure 5:
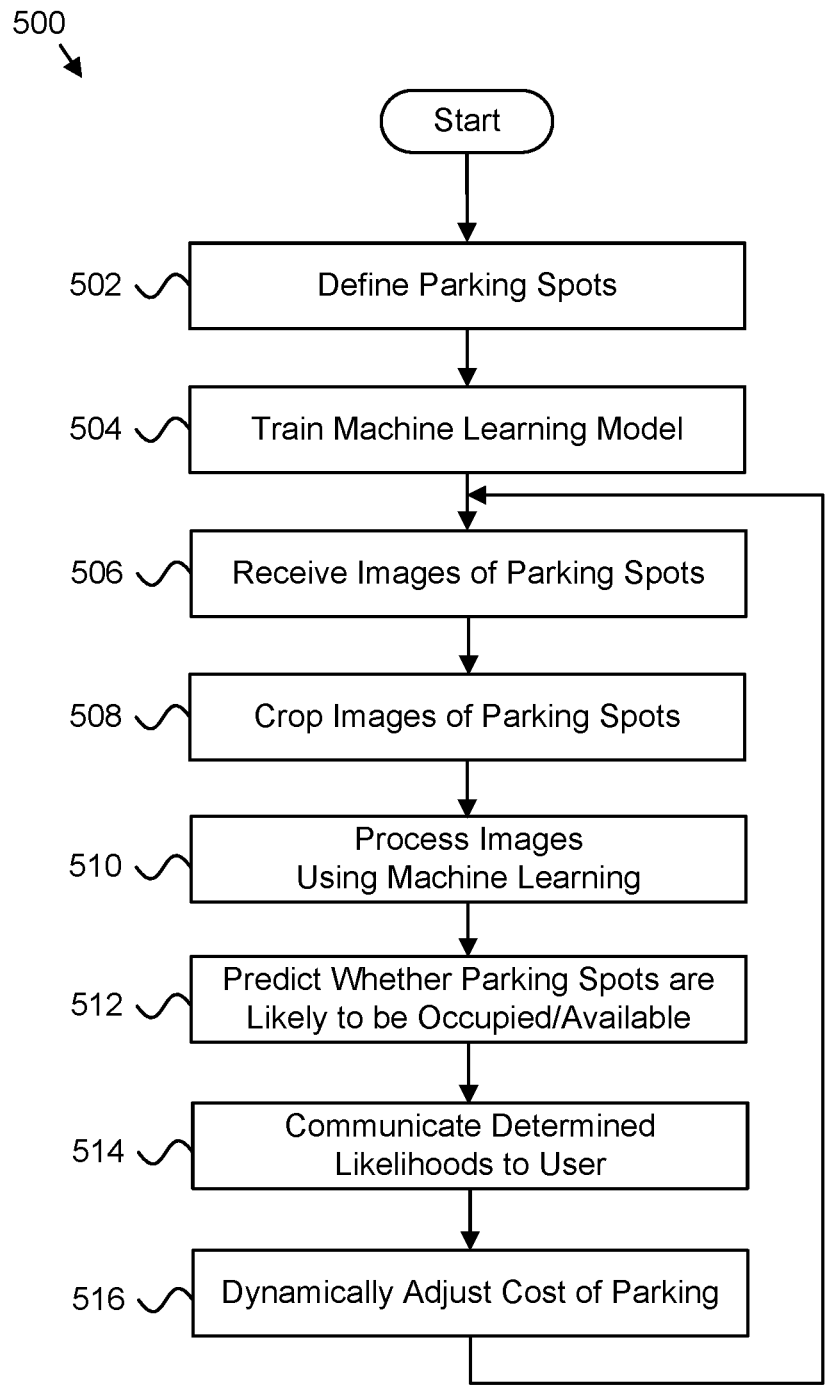
FIG. 5 is a schematic flow chart diagram illustrating a further embodiment of a method for machine learning parking determination.

FIG. 5 depicts one embodiment of a method 500 for machine learning parking determination. The method 500 begins and an electronic hardware parking device 104 defines 502 one or more parking spots 112 (e.g., based on input from an administrator or other user, using an object recognition or other machine learning model, or the like). An electronic hardware parking device 104 trains 504 a machine learning model (e.g., on images of occupied and available parking spots 112, on images of vehicles 114 for object recognition, or the like).

An electronic hardware parking device 104 receives 506 one or more images 302 of one or more parking spots 112 taken by an image sensor 110. An electronic hardware parking device 104 crops 508 the one or more parking spots 112 from the one or more images 302 into individual images 302 based on the definition 502 of the one or more parking spots 112. An electronic hardware parking device 104 processes 510 the one or more images 302 of the one or more parking spots 112 using a machine learning model to determine one or more likelihoods that the one or more parking spots 112 are occupied and/or available.

An electronic hardware parking device 104 predicts 512, using a machine learning model, whether the one or more parking spots 112 are likely to be occupied or available at a future time based on the determined one or more likelihoods and on previous determinations of likelihoods that the one or more parking spots are occupied and/or available. An electronic hardware parking device 104 communicates 514 to a user, on an electronic display screen of a hardware computing device 102, the predicted 512 likelihoods of whether the one or more parking spots 112 are likely to be occupied or available. An electronic hardware parking device 104 dynamically adjusts 516 a cost of parking based on based on whether the one or more parking spots 112 are occupied or available and the method continues with an electronic hardware parking device 104 receiving 506 one or more subsequent images 302 of one or more parking spots 112.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments. These features and advantages of the embodiments will become more fully apparent from the following description and appended claims or may be learned by the practice of embodiments as set forth hereinafter.

As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules to emphasize their implementation independence more particularly. For example, a module may be implemented as a hardware circuit comprising custom very large scale integrated ("VLSI") circuits or gate arrays, off-the-shelf semiconductor circuits such as logic chips, transistors, or other discrete components. A module may also be implemented in programmable hardware devices such as an FPGA, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a server, cloud storage (which may include one or more services in the same or separate locations), a hard disk, a solid state drive ("SSD"), an SD card, a random access memory ("RAM"), a read-only memory ("ROM"), an erasable programmable read-only memory ("EPROM" or Flash memory), a static random access memory ("SRAM"), a Blu-ray disk, a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, a personal area network, a wireless mesh network, and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages.

The computer readable program instructions may execute entirely on the user's computer, partly on the user's computer, as a stand-alone software package, partly on the user's computer and partly on a remote computer or service or entirely on the remote computer or server or set of servers. In the latter scenario, the remote computer may be connected to the user's computer through any type of network, including the network types previously listed. Alternatively, the connection may be made to an external computer (for example, through the Internet using an Internet Service Provider). In some embodiments, electronic circuitry including, for example, programmable logic circuitry, FPGA, or programmable logic arrays ("PLA") may execute the computer readable program instructions by utilizing state information of the computer readable program instructions to personalize the electronic circuitry to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and computer program products according to various embodiments of the present invention. In this regard, each block in the schematic flowchart diagrams and/or schematic block diagrams may represent a module, segment, or portion of code, which comprises one or more executable instructions of the program code for implementing the specified logical functions.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Means for performing the steps described herein, in various embodiments, may include one or more of a network interface, a controller (e.g., a CPU, a processor core, an FPGA or other programmable logic, an ASIC, a microcontroller, and/or another semiconductor integrated circuit device), a hardware appliance or other hardware device, other logic hardware, and/or other executable code stored on a computer readable storage medium. Other embodiments may include similar or equivalent means for performing the steps described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
multiple image sensors disposed at different parking lots, the different parking lots comprise ng multiple parking spots each and each having different distances from a destination;
an electronic hardware parking device in communication with the multiple image sensors, the electronic hardware parking device comprising a processor and a memory, the memory storing computer program code executable by the processor to perform operations, the operations comprising:
receiving images taken by the image sensors, each of the images comprising multiple parking spots at one of the different parking lots;
presenting a graphical user interface to administrators for each of the different parking lots allowing the administrators to graphically define, in the images of the multiple parking spots, locations of the multiple parking spots by selecting at least two diagonal corners for each of the multiple parking spots within the graphical user interface;
processing the images of the multiple parking spots using a machine learning model to determine likelihoods that each of the multiple parking spots are occupied;
predicting, using a second machine learning model, whether one or more of the parking spots are likely to be occupied or available at a future time based on the likelihoods that the parking spots are occupied and on a plurality of previous determinations of likelihoods that the parking spots are occupied; and
communicating to a user, on a hardware computing device, a recommendation of one or more of the different parking lots for an unoccupied parking spot, based on the determined likelihoods that the parking spots are occupied, the predictions of whether one or more of the parking spots are likely to be occupied, and on a distance away from the destination that a user is willing to park.

2. The apparatus of claim 1, the operations further comprising predicting, using a second machine learning model, whether one or more of the parking spots are likely to be occupied or available at a future time based on the likelihoods that the parking spots are occupied and on a plurality of previous determinations of likelihoods that the parking spots are occupied.

3. The apparatus of claim 1, wherein at least one of the image sensors is coupled to the electronic hardware parking device in proximity to one of the different parking lots such that the image sensor is in view of the one of the different parking lots.

4. The apparatus of claim 1, wherein at least one of the image sensors is remote from the electronic hardware parking device and the electronic hardware parking device receives at least some of the images over a data network using an application programming interface of the electronic hardware parking device.

5. The apparatus of claim 1, wherein the operations further comprise:
detecting the multiple parking spots in each of the images;
processing the images using the machine learning model to determine separate likelihoods that each of the multiple parking spots are occupied; and
communicating to the user, on the hardware computing device, whether each of the multiple parking spots are occupied or available based on the determined separate likelihoods that each of the multiple parking spots are occupied.

6. The apparatus of claim 5, the operations further comprising dynamically adjusting a cost of parking based on whether the multiple parking spots are occupied or available.

7. The apparatus of claim 1, wherein at least one of the image sensors comprises a preexisting security camera in proximity to one of the different parking lots.

8. The apparatus of claim 1, wherein at least one of the image sensors comprises an airborne drone flying in proximity to at least one of the different parking lots and in communication with the electronic hardware parking device over a wireless data network.

9. The apparatus of claim 1, the operations further comprising cropping each of the multiple parking spots from the images for processing using the machine learning model.

10. The apparatus of claim 1, the operations further comprising notifying an administrator associated with at least one of the parking lots in response to determining that at least one of the multiple parking spots has been occupied for at least a threshold amount of time.

11. The apparatus of claim 1, the operations further comprising notifying an administrator associated with at least one of the parking lots in response to determining that at least one of the multiple parking spots has been available for at least a threshold amount of time.

12. A computer program product comprising a non-transitory computer readable storage medium storing computer program code executable to perform operations, the operations comprising:
receiving images taken by the image sensors, each of the images comprising multiple parking spots at one of the different parking lots;
presenting a graphical user interface to administrators for each of the different parking lots allowing the administrators to graphically define, in the images of the multiple parking spots, locations of the multiple parking spots by selecting at least two diagonal corners for each of the multiple parking spots within the graphical user interface;
processing the images of the multiple parking spots using a machine learning model to determine likelihoods that each of the multiple parking spots are occupied;
predicting, using a second machine learning model, whether one or more of the parking spots are likely to be occupied or available at a future time based on the likelihoods that the parking spots are occupied and on a plurality of previous determinations of likelihoods that the parking spots are occupied; and
communicating to a user, on a hardware computing device, a recommendation of one or more of the different parking lots for an unoccupied parking spot, based on the determined likelihoods that the parking spots are occupied, the predictions of whether one or more of the parking spots are likely to be occupied, and on a distance away from the destination that a user is willing to park.

13. The computer program product of claim 12, the operations further comprising predicting, using a second machine learning model, whether one or more of the parking spots are likely to be occupied or available at a future time based on the likelihoods that the parking spots are occupied and on a plurality of previous determinations of likelihoods that the parking spots are occupied.

14. A method comprising:
   receiving images taken by the image sensors, each of the images comprising multiple parking spots at one of the different parking lots;
   presenting a graphical user interface to administrators for each of the different parking lots allowing the administrators to graphically define, in the images of the multiple parking spots, locations of the multiple parking spots by selecting at least two diagonal corners for each of the multiple parking spots within the graphical user interface;
   processing the images of the multiple parking spots using a machine learning model to determine likelihoods that each of the multiple parking spots are occupied;
   predicting, using a second machine learning model, whether one or more of the parking spots are likely to be occupied or available at a future time based on the likelihoods that the parking spots are occupied and on a plurality of previous determinations of likelihoods that the parking spots are occupied; and
   communicating to a user, on a hardware computing device, a recommendation of one or more of the different parking lots for an unoccupied parking spot, based on the determined likelihoods that the parking spots are occupied, the predictions of whether one or more of the parking spots are likely to be occupied, and on a distance away from the destination that a user is willing to park.

* * * * *